Oct. 24, 1939.   H. C. LOETZ   2,177,041
CHERRY PICKER
Filed April 21, 1939   2 Sheets-Sheet 2
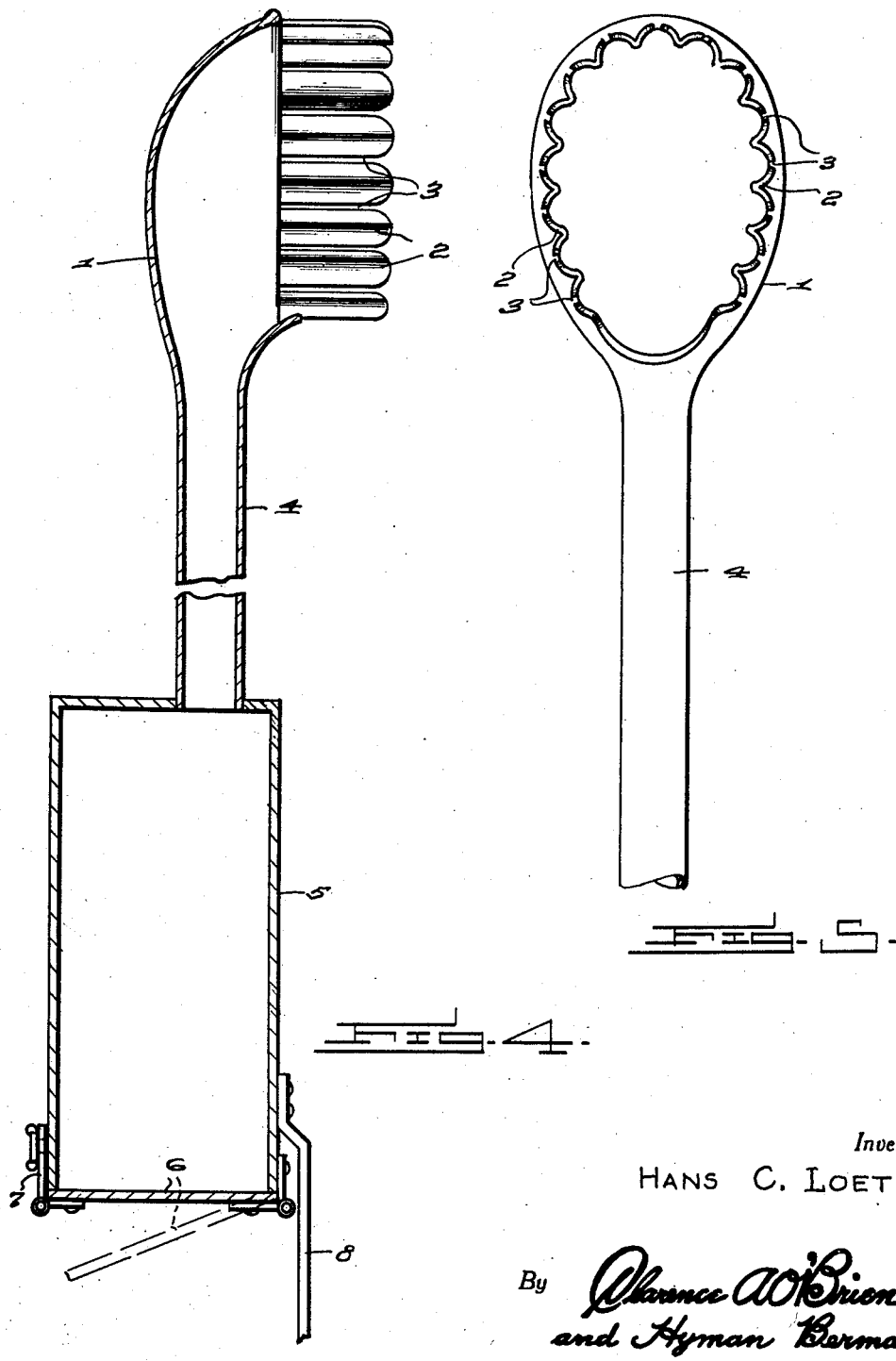
Inventor
HANS C. LOETZ,
By *Clarence A. O'Brien
and Hyman Berman*
Attorneys Patented Oct. 24, 1939

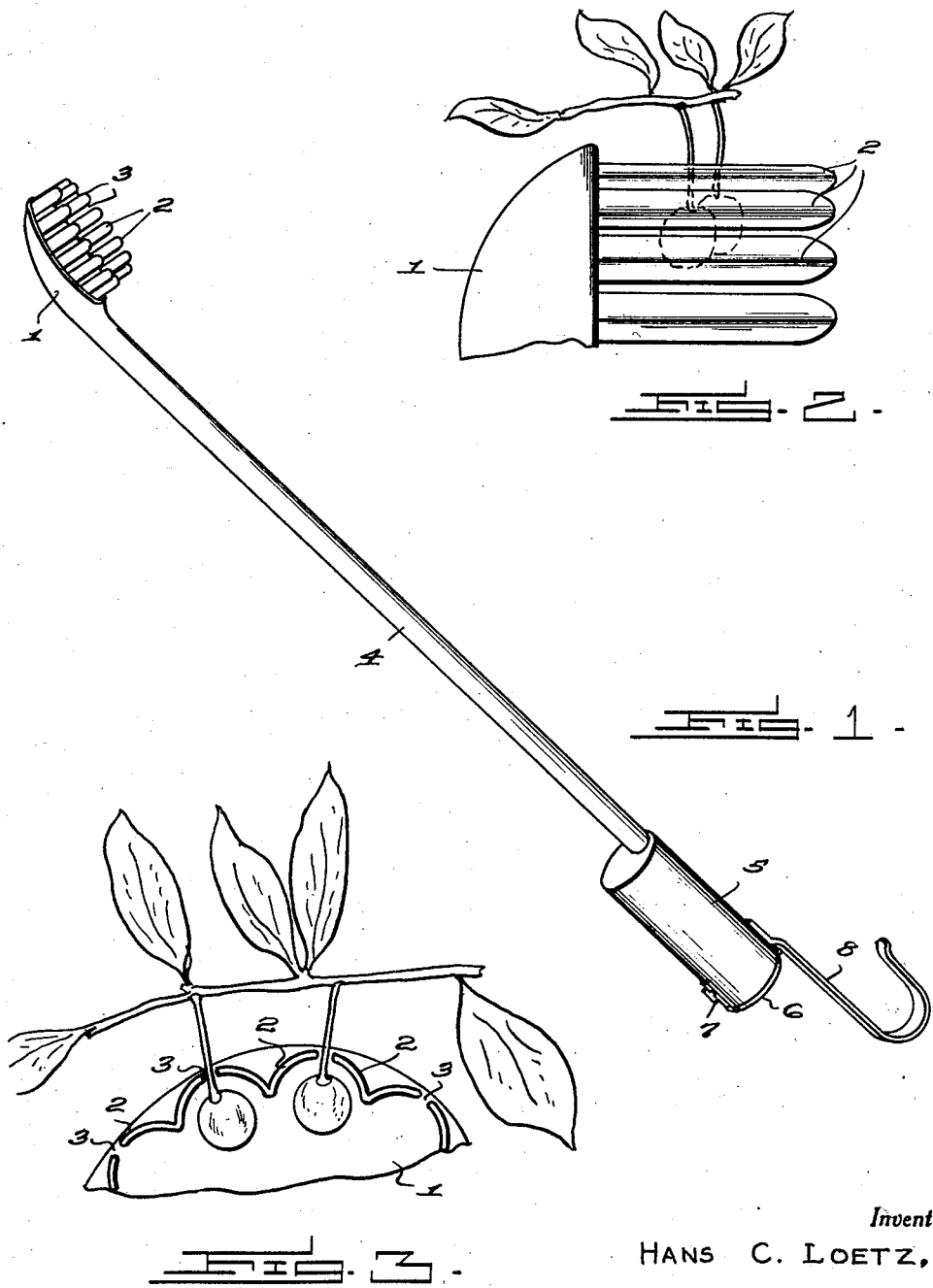

2,177,041

UNITED STATES PATENT OFFICE 2,177,041

CHERRY PICKER

Hans C. Loetz, Sturgis, Mich.

Application April 21, 1939, Serial No. 269,240

1 Claim. (Cl. 56—340)

This invention relates to a device for picking cherries and similar fruit, the general object of the invention being to provide a hollow head having tines extending around the circumference of its mouth with a tube leading from the head into a container whereby by placing the tines over the stems of the cherries and slightly moving the device the cherries will be pulled and will drop into the head and flow down the tube into the container.

Another object of the invention is to provide an opening in the bottom of the container closed by a door so that the container can be readily emptied, with a hook connected with the container so that the device can be hung on a limb or other support while the picker is moving about in a tree.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a perspective view of the device.

Figure 2 is a fragmentary view showing how the tines receive the stems of the cherries.

Figure 3 is a view looking toward the tines and showing how the stems pass between the tines and also showing how the tines are corrugated.

Figure 4 is a longitudinal sectional view through the device.

Figure 5 is a view looking toward the tine carrying side of the head with the tube leading from the head in elevation.

In these views the numeral 1 indicates a hollow head which has an opening opening out through a flat side thereof and around this opening are arranged the tines 2 which extend outwardly from said side of the head and are slightly spaced apart as shown at 3. Each tine is of corrugated shape so that it is substantially of V-shape in cross section with the recess formed by the limbs of the V facing outwardly. A tubular shank 4 depends from the hollow head and has its lower end entering the top of the container 5, the bottom of which is open, but said bottom is closed by a hinged door 6 provided with suitable latch means 7. A hook 8 is connected with the container so that the entire device can be hung on a limb or branch as the picker is moving about a tree.

As shown in Figures 2 and 3, the tines are passed over the stems of the cherries and then the device is given a slight movement to pull the cherries from the branch and said cherries drop into the hollow head and pass down the shank 4 into the container 5 from which they can be removed by opening the door 6.

The device may be made of light material so that it can be readily handled by one hand of the picker.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A cherry picker of the class described comprising an elongated tubular handle part having an enlarged hollow head at its upper end, said head having a flat side face having an opening therein, said face being substantially parallel to the longitudinal plane of the tubular handle part and offset outwardly from such plane, tines extending from said flat part and surrounding the opening therein, each tine being of substantially V-shape in cross section with the limbs of one tine spaced from the limbs of the other tine for forming spaces for receiving the stems of the cherries, said limbs being of concave shape on their inner faces for forming concavities for receiving the cherries when the stems are passed through the spaces, a container having its upper end connected with and in communication with the lower end of the tubular handle member and a door for closing the lower end of the container.

HANS C. LOETZ.